(12) United States Patent
Kleen et al.

(10) Patent No.: US 11,486,726 B2
(45) Date of Patent: Nov. 1, 2022

(54) OVERLAYING ADDITIONAL INFORMATION ON A DISPLAY UNIT

(71) Applicant: VOLKSWAGEN AKTIENGESELLSCHAFT, Wolfsburg (DE)

(72) Inventors: Andro Kleen, Braunschweig (DE); Michael Wittkämper, Braunschweig (DE); Robert Jan Wyszka, Hannover (DE); Adrian Haar, Hannover (DE)

(73) Assignee: Volkswagen Aktiengesellschaft

( * ) Notice: Subject to any disclaimer, the term of this patent is extended or adjusted under 35 U.S.C. 154(b) by 0 days.

(21) Appl. No.: 16/976,940

(22) PCT Filed: Feb. 14, 2019

(86) PCT No.: PCT/EP2019/053743
§ 371 (c)(1),
(2) Date: Aug. 31, 2020

(87) PCT Pub. No.: WO2019/170387
PCT Pub. Date: Sep. 12, 2019

(65) Prior Publication Data
US 2020/0393263 A1 Dec. 17, 2020

(30) Foreign Application Priority Data
Mar. 7, 2018 (DE) .................. 10 2018 203 462.1

(51) Int. Cl.
*G01C 21/36* (2006.01)
*B60K 35/00* (2006.01)

(52) U.S. Cl.
CPC ............ *G01C 21/365* (2013.01); *B60K 35/00* (2013.01); *G01C 21/3632* (2013.01);
(Continued)

(58) Field of Classification Search
CPC .............. G01C 21/3655; G01C 21/365; G01C 21/3632; G02B 27/01; G02B 2027/014;
(Continued)

(56) References Cited

U.S. PATENT DOCUMENTS 7,284,782 B2 * 10/2007 Uenuma .................... B60J 1/00
296/84.1
9,581,457 B1 * 2/2017 Meredith ........... G01C 21/3679
(Continued)

FOREIGN PATENT DOCUMENTS

DE 102006010481 A1 9/2007
DE 102008042397 A1 4/2010
(Continued)

OTHER PUBLICATIONS

Collins; Head-up Guidance (HGS) Demo—It's Intuitive and Easy to Fly; Jul. 9, 2012; retrieved from https://www.youtube.com/watch?v=0ISvrO3j9SU.
(Continued)

*Primary Examiner* — Christopher E Leiby
(74) *Attorney, Agent, or Firm* — Barnes & Thornburg, LLP

(57) ABSTRACT

A method for calculating an overlay of additional information for a display on a display unit, in particular, a head-up display of a transportation vehicle or data glasses. The overlay of additional information supports the driver in the longitudinal control of a transportation vehicle. The position of an upcoming waypoint is detected, which is specified by the navigation system. When the observer transportation vehicle approaches the waypoint, an animation graphic is calculated, wherein the animation graphic has a grid shape. The animation graphic is calculated so that distance markers (Continued)

are inserted from the observer transportation vehicle to the waypoint, which permit estimation of the distance to the waypoint.

16 Claims, 5 Drawing Sheets

(52) U.S. Cl.
CPC .......................... *B60K 2370/1529* (2019.05); *B60K 2370/166* (2019.05); *B60K 2370/177* (2019.05); *B60K 2370/188* (2019.05); *B60K 2370/191* (2019.05); *B60K 2370/347* (2019.05)

(58) Field of Classification Search
CPC ............ G02B 2027/0141; B60K 35/00; B60K 2370/165; B60K 2370/166; B60K 2370/188; B60K 2370/191; B60K 2370/1529; B60K 2370/177; B60K 2370/347
See application file for complete search history.

(56) References Cited

U.S. PATENT DOCUMENTS

| | | | |
|---|---|---|---|
| 10,422,655 B2* | 9/2019 | Kosaka | G01C 21/365 |
| 10,539,790 B2 | 1/2020 | Oh et al. | |
| 10,789,490 B2* | 9/2020 | Kleen | G06K 9/00671 |
| 2005/0280275 A1* | 12/2005 | Uenuma | B60R 1/00 296/84.1 |
| 2009/0187333 A1 | 7/2009 | Mueller | |
| 2010/0153000 A1* | 6/2010 | Akita | G01C 21/3632 701/429 |
| 2011/0102303 A1 | 5/2011 | Kakizaki | |
| 2012/0170130 A1* | 7/2012 | Sasaki | B60K 35/00 359/630 |
| 2012/0268351 A1* | 10/2012 | Sasaki | G01C 21/365 345/8 |
| 2014/0203923 A1 | 7/2014 | Lai et al. | |
| 2014/0267400 A1 | 9/2014 | Mabbutt et al. | |
| 2014/0268353 A1* | 9/2014 | Fujimura | G02B 27/01 359/630 |
| 2016/0109701 A1 | 4/2016 | Goldman-Shenhar et al. | |
| 2016/0153801 A1 | 6/2016 | Cho et al. | |
| 2017/0199049 A1 | 7/2017 | Cho et al. | |
| 2017/0336222 A1* | 11/2017 | Yamaguchi | G01C 21/365 |
| 2017/0336629 A1* | 11/2017 | Suzuki | G05D 1/0088 |
| 2018/0306597 A1* | 10/2018 | Kosaka | B60K 35/00 |
| 2019/0202479 A1* | 7/2019 | Beauvais | B60K 35/00 |
| 2019/0248287 A1* | 8/2019 | Ono | B60K 35/00 |
| 2020/0183157 A1* | 6/2020 | Suzuki | G02B 27/01 |
| 2020/0369149 A1* | 11/2020 | Kassn | G06T 11/001 |
| 2020/0376961 A1* | 12/2020 | Kleen | G02B 27/0101 |

FOREIGN PATENT DOCUMENTS

| | | |
|---|---|---|
| DE | 102011112943 A1 | 3/2013 |
| DE | 102011121763 A1 | 6/2013 |
| DE | 102013010818 A1 | 12/2013 |
| DE | 102012215038 A1 | 5/2014 |
| DE | 102014008152 A1 | 10/2014 |
| DE | 102014200407 A1 | 7/2015 |
| DE | 102015117381 A1 | 4/2016 |
| DE | 102016223179 A1 | 5/2017 |
| EP | 3360716 A1 | 8/2018 |
| JP | H08190696 A | 7/1996 |
| JP | 2005265573 A | 9/2005 |
| JP | 2011185951 A | 9/2011 |
| WO | 2013046424 A1 | 4/2013 |
| WO | 2017061035 A1 | 4/2017 |
| WO | 2019105679 A1 | 6/2019 |

OTHER PUBLICATIONS

Search Report for International Patent Application No. PCT/EP2019/053743; dated Jun. 19, 2019.

Effie; WayRay Announces Partnership with Banma Invested by Alibaba to Develop AR enabled Car Navigation System; Mar. 14, 2017; Lausanne, Switzerland.

* cited by examiner

OVERLAYING ADDITIONAL INFORMATION ON A DISPLAY UNIT

PRIORITY CLAIM

This patent application is a U.S. National Phase of International Patent Application No. PCT/EP2019/053743, filed 14 Feb. 2019, which claims priority to German Patent Application No. 10 2018 203 462.1, filed 7 Mar. 2018, the disclosures of which are incorporated herein by reference in their entireties.

SUMMARY

Illustrative embodiments relate to the technical field of driver information systems, also known by the term infotainment system. Such systems are used primarily in transportation vehicles. However, it is also possible to use the disclosed embodiments with pedestrians, cyclists, etc., by way of smartglasses. Illustrative embodiments furthermore relate to an apparatus that is accordingly designed for performing the method and to a transportation vehicle and to a computer program.

BRIEF DESCRIPTION OF THE DRAWINGS

Exemplary embodiments are illustrated in the drawings and will be explained in more detail below with reference to the figures, in which.

DETAILED DESCRIPTION

Figure 1:
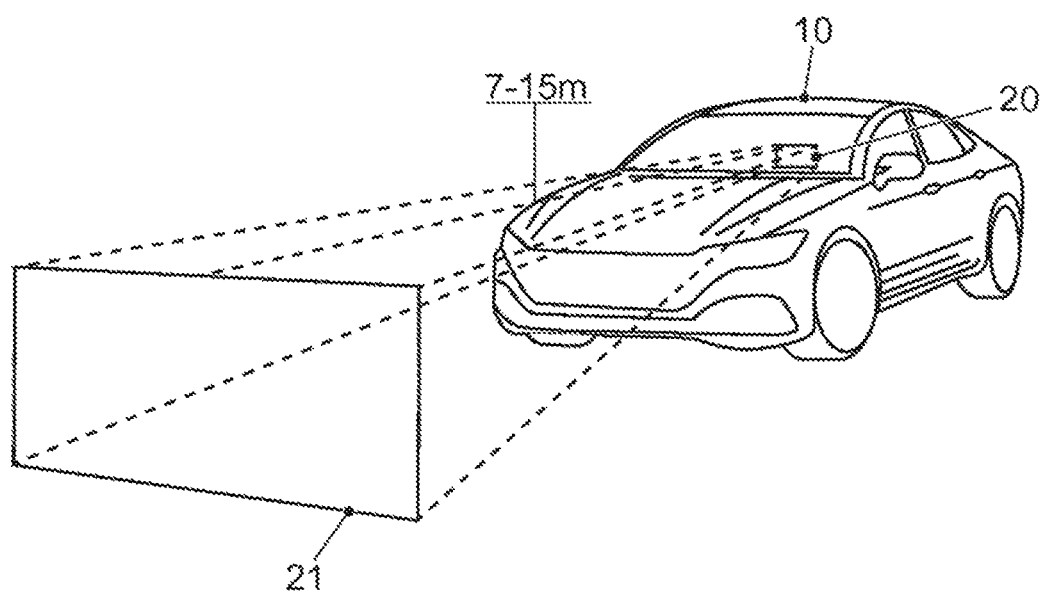
FIG. 1 shows the principle of superposition of information into the field of view of the driver of a transportation vehicle during the journey with the aid of a head-up display.

It is a future vision in the automotive industry to be able to reproduce virtual elements on the windshield of one's own transportation vehicle to offer the driver a few benefits. What is known as "augmented reality" technology (AR technology) is used here. The corresponding German term "erweiterte Realität" is less well-known. In this case, the real surroundings are enriched with virtual elements. This has several benefits: it obviates the need to look down at displays other than the windshield because many relevant pieces of information are imaged onto the windshield. The driver therefore has no need to take their gaze off the road. What is special about AR representations is that the position-accurate localization of the virtual elements in the real environment is possible. In addition, the virtual element is superposed at the location where the driver aims their gaze in the real environment. With these superpositions, the real environment can be "overlaid" from the view of the user and be provided with additional information, for example, a navigation path can be superposed. Thus, less cognitive effort on the part of the driver is achieved because there is no need to interpret an abstract graphic, and instead intuitive comprehension as part of the normal perception habits can take place.

Currently, head-up displays (HUDs) are used in transportation vehicles. These also have the benefit that the image of the HUD appears to be closer to the real environment. The displays are actually projection units that project an image onto the windshield. However, from the view of the driver, this image is located a few meters up to 15 meters in front of the transportation vehicle, depending on the construction type of the module. This has the benefit that the superposed information is presented such that the eyes of the driver themselves are relieved of the accommodation action.

The "image" is here composed as follows: it is less a virtual display but rather a type of "keyhole" into the virtual world. The virtual surroundings are theoretically overlaid on the real world and contain the virtual objects that assist and inform the driver during the journey. Due to the limited display surface of the HUD, a section thereof can be seen. In other words, the section of the virtual world is seen through the display surface of the HUD. Since these virtual surroundings supplement the real surroundings, the term "mixed reality" is also used in this case.

Intensive work relating to technologies that are intended to make autonomous driving possible in the future is likewise currently underway. A first approach is here not to completely relieve the driver of their tasks but to ensure that the driver can assume control of the transportation vehicle at any time. The driver additionally performs monitoring functions. Owing to recent technologies in the field of driver information systems such as head-up displays (HUDs), it is possible to better inform the driver about the events in the vicinity of their transportation vehicle.

To realize that, the use of recent technologies (vehicle-to-vehicle communication, use of databases, vehicle sensor system, etc.) is necessary so that comprehensive information relating to objects (in particular, vehicles) in the direct vicinity of one's own transportation vehicle will be available. In the field of vehicle sensor systems, in particular, the following components that make observation of the vicinity possible are mentioned: RADAR devices a.k.a. radio detection and ranging, LIDAR devices a.k.a. light detection and ranging, mainly for the field of distance capturing/warning, and cameras having corresponding image processing for the field of object detection. These data relating to the environment can be used as a basis for system-based driving recommendations, warnings, etc. For example, displays/warnings relating to the direction into which another transportation vehicle in the vicinity wishes to turn (possibly into the own trajectory) are thus conceivable.

Vehicle-to-vehicle communication has meanwhile also become possible using mobile communication with systems such as LTE a.k.a. long-term evolution. In this respect, the organization 3GPP has issued a specification called LTE V2X. Alternatives available are systems for the vehicle direct communication based on WLAN technology, in particular, the system according to WLAN p.

Owing to the current development toward higher autonomy levels, yet where many transportation vehicles continue to be controlled by the driver, it should be assumed that corresponding additional information can already be used in the medium term for manually controlled transportation vehicles rather than only for highly automated systems in the longer term. The solution which will be described in more detail below can here be used both for manually controlled and for automatically controlled transportation vehicles.

The question for driver-vehicle interaction is here how the information can be represented such that it provides true added value for the human driver and the driver can also quickly, or intuitively, locate the information provided. The following solutions in this field are already known here from the prior art.

DE 10 2014 200 407 A1 discloses a method for operating a field-of-view display device (head-up display) for a transportation vehicle. In the method, images of navigation information are superposed into a field of view of a driver of a transportation vehicle such that the images are overlaid on objects in the field of view. The images can here be dynamically tracked so that the images appear fixed at the objects. For this purpose, a distance between the transportation vehicle and a location is ascertained for representing navigation information in a vicinity of the transportation vehicle. The driver can be provided, for example, with navigation cues using the technology by marking the road ahead up to the horizon in color or by displaying navigation cues as arrows located directly on the road.

DE 10 2015 117 381 A1 discloses a method and an apparatus in which information such as navigation information is likewise superposed on a HUD display unit. A piece of navigation information that is represented by the HUD display unit can, for example, comprise projecting a distance from a nearest road turn and the current speed of the transportation vehicle as compared to a speed limit, including an alarm if the speed limit is exceeded.

Most transportation vehicles nowadays have a navigation system to provide destination and road guidance for a driver. Transportation vehicles having a HUD that is installed therein are furthermore offered on the market, wherein the HUD projects desired information onto the windshield and makes it possible for the driver to view the projected information while the driver looks to the front. DE 10 2016 223 179 A1 discloses a coordinate matching apparatus and a corresponding method for a head-up display (HUD), which not only match a coordinate of a surroundings information measurement device to a coordinate of the HUD but also convert the position of an object such that the viewing angles are matched so as to display information measured by the surroundings information measurement device.

DE 10 2011 112 943 A1 discloses a method for providing a driver assistance system with automatic longitudinal control for a transportation vehicle in which the route section lying ahead is visualized on a display surface, wherein at least one graphic object that is assigned to a function of the automatic longitudinal control is represented in the visualized route section. The method for providing a driver assistance system with automatic longitudinal control is characterized in that a video image sequence relating to the route section lying ahead is recorded and reproduced in real time on the display surface and the at least one graphic object is overlaid on the video image sequence. A distance bar visualizing a safety distance can be superposed as the object.

DE 10 2011 121 763 A1 discloses a method for representing distance information on a display apparatus of a transportation vehicle. The method is characterized in that a real image of the lane lying in front of the transportation vehicle is recorded with a camera and a safety distance from the transportation vehicle driving in front is ascertained based on at least one driving-dynamic variable of the transportation vehicle. The real image is extended by a virtual image component, such as a crossbar, displaying the safety distance from the transportation vehicle driving ahead in a positionally correct manner.

A major benefit of the "augmented reality" displays (AR displays) known to date is the representation of the corresponding displays directly within or as part of the environment. Relatively obvious examples typically relate to the field of navigation. While conventional navigation displays (in conventional HUDs) generally display schematic representations (e.g., an arrow extending at a right angle to the right to indicate that a right turn should be taken as soon as possible), AR displays offer significantly more effective possibilities. Since the displays can be represented as "part of the environment," extremely fast and intuitive interpretations are possible for the user. Nevertheless, the approaches that have been used to date also have various problems for which currently no solutions are known. This was recognized as part of the disclosure.

In current navigation systems, navigation cues are output but not correctly made consistent with the environment, which means that they cannot be intuitively understood. For example, if a freeway should be exited at a specific exit, current systems provide a voice announcement with exactly such a prompt and associated distance information (for example, "exit the freeway at the second exit coming up in 500 m"). Moreover, the conventional road turn pictograms and geometric shapes that visualize the arrival at the correct exit are displayed by way of a "decreasing loading bar." The problem here is that this information can be put into context with the actual situation on the road only with difficulty. If there are no metric orientation points in the environment, it is very difficult to keep track of whether, for example, 250 m or 400 m have already been traveled. This situation is very problematic in indifferent or ambiguous contexts, that is to say, for example, in the case of several freeway exits that are located immediately one after the other.

There is therefore a need for further improvements of the longitudinal control of a transportation vehicle and the associated feedback for the driver via the infotainment system.

Illustrative embodiments find such an approach.

This is achieved by a method for calculating a superposition of additional information for a display on a display unit, in particular, a head-up display (HUD) of a transportation vehicle or smartglasses, by an apparatus for performing the method, and by a transportation vehicle, and a computer program. The superposition of additional information here serves the purpose of assisting the driver with the longitudinal control of the transportation vehicle.

The solution is based on the distance up to the stated waypoint being displayed with superposed distance marks. The waypoint can be specified by the navigation system. The solution has the benefit that the voice announcements or numerical distance indications are rendered such that they are more easily understood by the driver and can be better put into context in the actual environment, specifically including in places where no real distance beacons have been placed at the side of the road.

The navigation system provides a navigation path, which can also be superposed over the real environment as AR superposition. The superposition of the navigation path can beneficially be effectuated in grid form. The grid consists of individual grid elements that are interpreted by the driver as a continuous navigation path, without covering the real environment more than is necessary.

For example, if, as in the example described above, the navigation system recommends to exit the freeway in 500 m, individual elements within the "navigation grid" can be graphically highlighted at regular distances (for example, every 100 m), for example, by way of colored marking or by different animations, such as by a single change in the shape or by a change in the location, such as, for example, erecting an element that had previously lain on the ground. It is also possible to superpose conventional distance beacons that do not exist in reality. With this approach, distance indications can be prepared by on-board systems as "milestones" and thus create improved spatial understanding.

The distance marks can be superposed at equidistant distances, such as 10 m, 25 m, 50 m, 75 m, 80 m, 100 m, 160 m, 200 m, 240 m, or 300 m in front of the waypoint.

In a different exemplary embodiment, the distance marks are composed in each case of a plurality of grid points of the animation graphic. This has the benefit that the distance marks appear as if integrated on the road, the driver need not avert their gaze and yet receives an exact distance indication to the announced waypoint.

For example, the distance marks can be composed of three or five grid points and symbolize an arrow in the driving direction. The gaze of the driver is thus intuitively directed toward the announced waypoint. At the waypoint itself, a different symbol can be composed of grid points, such as a turn arrow.

It is also beneficial if the grid points are represented by symbols. Here, for example, the shape of a diamond is suitable because it can be aligned in the direction of travel. If the diamond symbols are represented without being filled, they are integrated into the environment without causing a distraction and without covering important parts of the environment.

In a further disclosed embodiment, the calculation of the distance marks is performed based on the vicinity, the own speed of the observer vehicle, and/or a driving scenario. For example, in an urban area having low permissible maximum speeds, distance marks can be calculated in smaller cycles (for example, every 10 m), while distance marks on freeways are superposed, as is typical in this case, at 100-meter distances. The driving scenario and speed are considered to be separate determinants, because, for example, the grid symbols on the freeway in a traffic jam could have a different color than in the case in which freeway traffic is "flowing." The driving scenario comprises at least in part the traffic conditions.

To technically realize this procedure, it requires not only the exact localization of a transportation vehicle and recognition of the environment but also a computer-assisted procedure that scales or dimensions the AR displays such that they correspond exactly to the physical conditions that are to be communicated to the respective driver and their perceptual system. The corresponding algorithms must thus reconcile a position that has been ascertained by the localization system with the position of a maneuver that is to be performed and adapt the AR representations on the basis of the calculation such that the distance marks actually correspond to the real distances.

It is therefore beneficial for an apparatus for performing the method that it can locate the waypoint specified by the navigation system in the surroundings recorded by the capturing method or mechanism. At least one exemplary embodiment consists in the use of highly accurate maps and in the ascertainment of the localization on the map, for example, using GPS or an improved localization system. No further sensors would be required on the transportation vehicle for this purpose. In another exemplary embodiment, imaging sensors installed in the transportation vehicle are additionally used. For this, correspondingly adapted image evaluation methods that evaluate the images provided by one or more front cameras are able to be used. Particularly suitable for this application is a stereo camera that is capable of providing 3D image sequences. A LIDAR or RADAR sensor might also be a possibility. The image evaluation methods can be programmed either to detect a waypoint on the basis of the curvature of the roadside (a turning in a road) or to determine the waypoint by recognizing spatially fixed traffic signs or other infrastructure objects or infrastructure points, such as traffic lights, railway crossings, zebra crossings, etc. Another possibility is to use fixedly installed radio beacons that transmit the exact distance from the waypoint and are designed such that they can be easily recognized by way of image evaluation. The apparatus will then receive the signal of the radio beacons and evaluate it to superpose the corresponding distance beacon in the correct location at the level of the radio beacon in the navigation route.

In addition, the characteristics of the driver, such as position of the seat, eye position, and distance between the eyes, and in addition the exact HUD settings ("look-down angle," etc.) can be taken into account to optimize the display of the "distance beacons." This requires a HUD display system in which the parameters are input or captured.

Moreover, the same benefits as are mentioned for the claims having the corresponding method operations apply to the apparatus for performing the method with the correspondingly programmed computation unit.

It is particularly beneficial if the display unit of the apparatus is designed as a head-up display. Rather than a head-up display, smartglasses or a monitor on which a camera image is displayed into which the grid is superposed can be used as the display unit in the apparatus.

The disclosed apparatus can be used in a transportation vehicle. The disclosed embodiments may be realized in the transportation vehicle such that the display unit is fixedly installed in the transportation vehicle, for example, as a head-up display. Nevertheless, a possible realization with the aid of smartglasses would also be possible if the driver were to be permitted to use smartglasses in the future.

As mentioned, the disclosed embodiments can also be used if the display unit is smartglasses. In this case, the disclosed method can be used even for pedestrians, cyclists, motorcyclists, etc.

The corresponding benefits as described in relation to the disclosed method apply to a computer program that is being executed in the computation unit of the apparatus to perform the disclosed method.

The present description illustrates the principles of the disclosure. It is thus understood that a person skilled in the art will be able to devise different arrangements that, although not explicitly described here, still embody the principles of the disclosure and are intended to likewise be protected by the scope of the disclosure.

FIG. 1 illustrates the principle method of function of a head-up display. The head-up display 20 is mounted in the transportation vehicle 10 below/behind the instrument cluster in the dashboard region. Additional information is superposed into the field of view of the driver by projection onto the windshield. The additional information appears as if it were projected onto a projection surface 21 at a distance of 7-15 m in front of the transportation vehicle 10. Yet the real world remains visible through this projection surface 21. Virtual surroundings, as it were, are created with the superposed additional information. The virtual surroundings are theoretically overlaid on the real world and contain the virtual objects that assist and inform the driver during the journey. However, projection takes place only onto part of the windshield so that the additional information cannot be arranged arbitrarily in the field of view of the driver.

Figure 2:
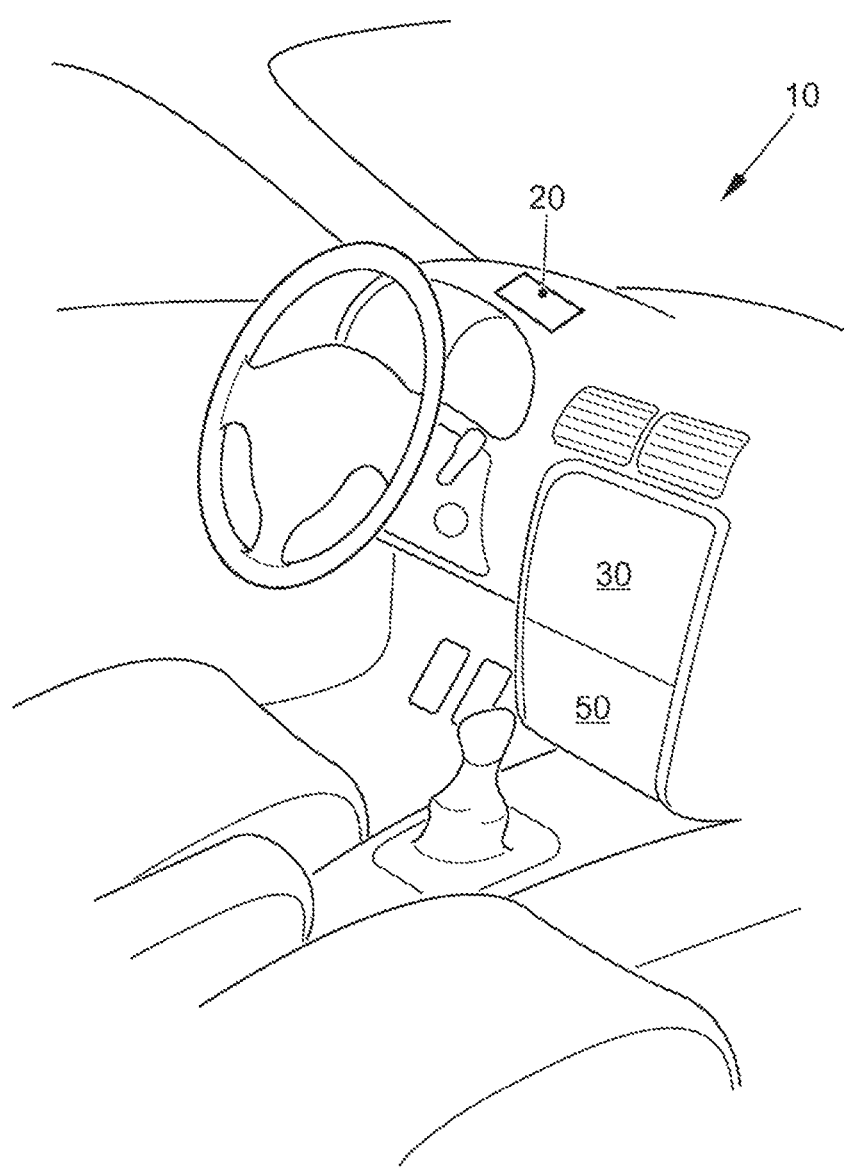
FIG. 2 shows the typical cockpit of a transportation vehicle.

FIG. 2 shows the cockpit of the transportation vehicle 10. It shows a passenger car. However, any other transportation vehicles are likewise conceivable as the transportation vehicle 10. Examples of further transportation vehicles are: buses, utility vehicles, in particular, trucks, agricultural machines, construction machines, rail vehicles, etc. The use of the disclosed embodiments would generally be possible for land vehicles, rail vehicles, watercraft, and aircraft.

In the cockpit, three display units of an infotainment system are shown. This is the head-up display 20 and a touch-sensitive screen 30, which is mounted in the center console. During the journey, the center console is not within the field of view of the driver. For this reason, the additional information is not superimposed on the display unit 30 during the journey.

The touch-sensitive screen 30 is here used for operating functions of the transportation vehicle 10. For example, it can be used to control a radio, a navigation system, playback of stored musical pieces, and/or an air-conditioning system, other electronic devices or other comfort functions or applications of the transportation vehicle 10. Together, this is frequently referred to as an "infotainment system." An infotainment system in transportation vehicles, specifically passenger cars, denotes the combination of car radio, navigation system, hands-free system, driver assistance systems and further functions in a central operating unit. The term infotainment is a portmanteau word of the words information and entertainment. To operate the infotainment system, mainly the touch-sensitive screen 30 ("touchscreen") is used, wherein this screen 30 can be seen easily and operated by a driver of the transportation vehicle 10, but also by a front passenger of the transportation vehicle 10. In addition, mechanical operating elements, such as keys, knobs, or combinations thereof, such as, for example, push rotation controllers, can be arranged in an input unit 50 below the screen 30. Typically, steering wheel control of parts of the infotainment system is also possible. This unit is not illustrated separately but is considered to be part of the input unit 50.

Figure 3:
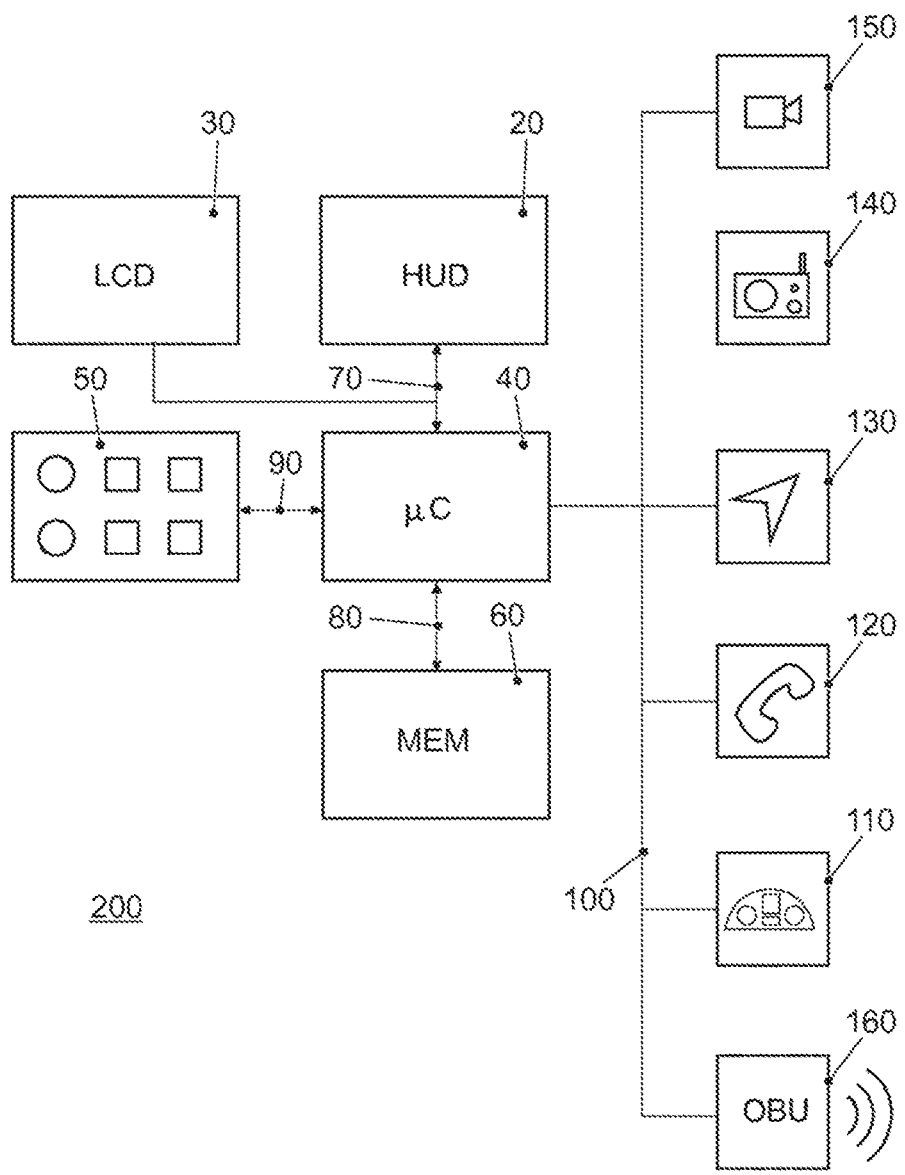
FIG. 3 shows the block diagram of the infotainment system of the transportation vehicle.

FIG. 3 schematically shows a block diagram of the infotainment system 200 and, by way of example, a few partial systems or applications of the infotainment system. The operating apparatus comprises the touch-sensitive display unit 30, a computation device 40, an input unit 50, and a memory 60. The display unit 30 comprises both a display surface for displaying variable graphic information and also an operating area (touch-sensitive layer) arranged over the display surface for inputting commands by way of a user.

The display unit 30 is connected to the computation device 40 via a data line 70. The data line can be designed in accordance with the LVDS standard a.k.a. low voltage differential signaling. The display unit 30 receives control data for controlling the display surface of the touchscreen 30 from the computation device 40 via the data line 70. Control data of the input commands are also transmitted via the data line 70 from the touchscreen 30 to the computation device 40. The reference numeral 50 denotes the input unit. The already mentioned operating elements such as keys, knobs, sliders or rotation push controllers, with the aid of which the operator can effect inputs by way of the menu navigation, are associated with the input unit. An input is generally understood to mean the selection of a selected menu option and also the changing of a parameter, switching a function on and off, etc.

The memory device 60 is connected to the computation device 40 via a data line 80. A pictogram registry and/or a symbol registry is saved in the memory 60 with the pictograms and/or symbols for the possible superpositions of additional information. The points/symbols that serve as a basis for the calculation of the grid superposition can also be saved here.

The further parts of the infotainment system camera 150, radio 140, navigation device 130, telephone 120, and instrument cluster 110 are connected to the apparatus for operating the infotainment system via the data bus 100. A suitable data bus 100 is the high-speed option of the CAN bus in accordance with the ISO standard 11898-2. Alternatively, the use of a bus system based on ethernet technology, such as BroadR Reach, is also possible. Bus systems in which the data transmission is effected via optical waveguides are likewise usable. Examples mentioned are the MOST bus (media-oriented system transport) or the D2B bus (domestic digital bus). It should also be mentioned here that the camera 150 can be designed as a conventional video camera. In this case, it records 25 frames/s, which corresponds to 50 fields/s in the interlace recording mode. Alternatively, a special camera that records more images/s can be used to increase the accuracy of the object detection in the case of objects that move faster. A plurality of cameras can be used for vicinity observation. In addition, the abovementioned RADAR or LIDAR systems could be used supplementarily or as an alternative to perform or expand vicinity observation. For wireless communication internally and with the outside, the transportation vehicle 10 is equipped with a communication module 160. This module is frequently also referred to as an on-board unit. It can be designed for mobile radio communication, for example, in accordance with the LTE standard a.k.a. long-term evolution. It can likewise be designed for WLAN communication, a.k.a. wireless LAN, be it for communication with devices belonging to passengers in the transportation vehicle or for vehicle-to-vehicle communication, etc.

The disclosed method for calculating a superposition of additional information for a display on a display unit 20 will be explained below with reference to an exemplary embodiment.

In the further figures, identical reference numerals denote the same fields and symbols as explained in the description of FIGS. 1 to 3.

Figure 4:
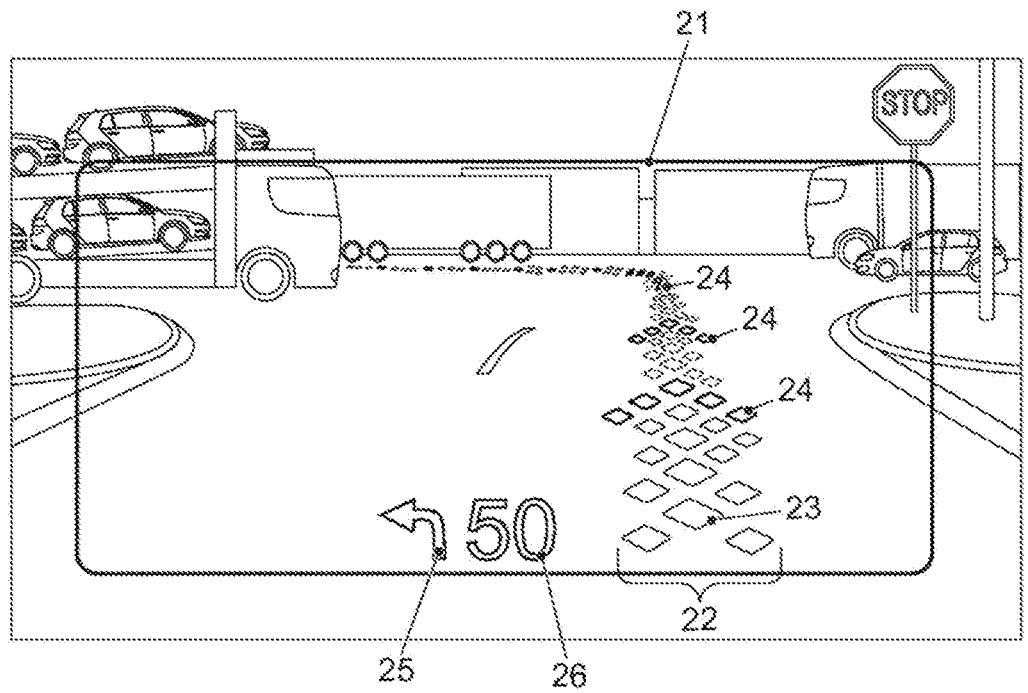
FIG. 4 shows an illustration of a grid superposition with distance marks that are highlighted in color for improved orientation of the driver along particular waypoints during the navigation of the transportation vehicle.

The disclosed display of the longitudinal control function of the transportation vehicle 10 on the HUD 20 is based on the display of a virtual grid that is represented at a distance above the actual road or without any distance from the road. The road, as a real lane of traffic, lies within the field of view of the driver. The AR superposition using the HUD 20 is effected as shown in FIG. 4. The grid 22 is projected such that it lies on the road or "floats in space" at a distance from the road. The grid is composed of a multiplicity of diamond symbols 23, which are represented as transmissive, that is to say only the boundary thereof can be seen, so as to prevent larger areas from being obscured. As illustrated, a grid 22 is superposed along the lane of traffic. The grid extends along the navigation route that has been precalculated by the navigation system 130. As illustrated, the navigation route leads toward a crossroad, where it turns left. The distance from the turning point is 50 m and is superposed in the lower image periphery as the distance indication 26, next to the turn arrow 25 to the left. The acoustic announcement that the turn should be effected in 50 m came from the navigation system 130. Since there is a further intersection point before the turning point, it is difficult for the driver to tell the point at which the turn is to take place. In addition, the turning location is difficult to view owing to a truck coming from the left. To assist the driver, distance marks 24 are superposed at a spacing of 10 m along the navigation path that is represented by the grid 22. The distance marks are composed in each case of five diamond symbols 23 of the grid 22 and are highlighted by a blue color. The other grid symbols 23 are shown in a white color. The driver intuitively recognizes the distance marks 24. The grid symbols 23 for the distance marks 24 are selected such that they form the shape of an arrow pointing forward, that is to say in the driving direction.

Figure 5:
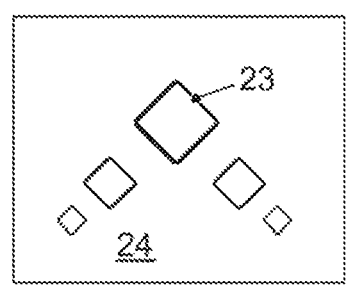
FIG. 5 shows an example of a visualization of a distance mark by the composition and highlighting of grid symbols.

This shape comes about owing to the distance mark 24 being composed of a grid central symbol and in each case two left and two right grid side symbols. These side symbols are here set back, as a result of which the shape of an arrow pointing forward is obtained. This composition of the distance mark 24 from grid symbols 23 is shown in more detail again in FIG. 5.

Figure 6:
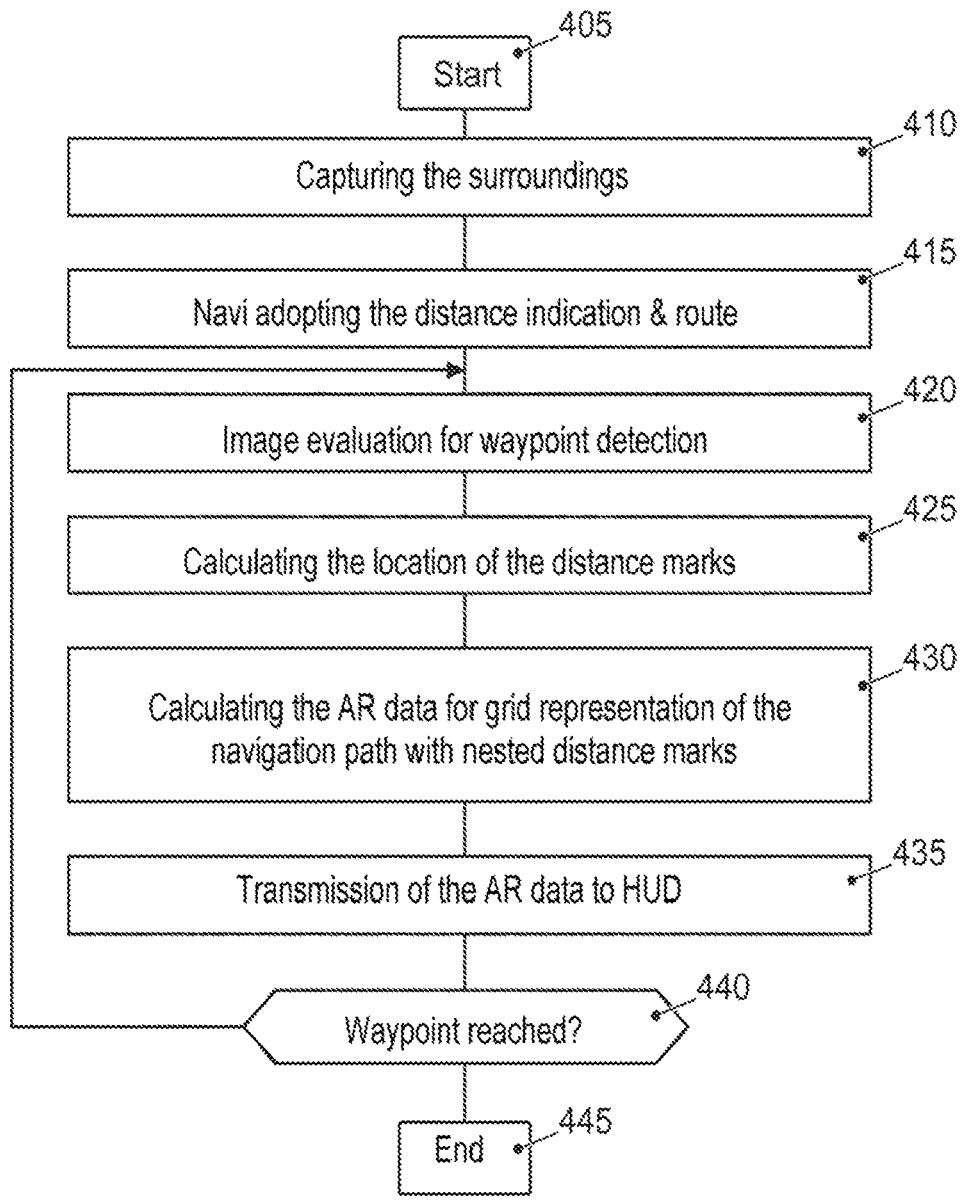
FIG. 6 shows a flowchart for a program for calculating AR superpositions for the display of the navigation route with nested distance marks.

FIG. 6 is used to also explain a computer program for calculating the AR superpositions for the distance marks 24. The program is executed in the computation unit 40. The program start is denoted by the reference numeral 405. In program operation at 410, the surroundings of the observer transportation vehicle 10 are captured. To this end, the images provided by the front camera 150 are evaluated with the object recognition algorithms provided for this purpose.

Next, in program operation at 415, the waypoint specified by the navigation system 130, the distance indication 26 announced by the navigation system 130, and the navigation path are adopted.

In program operation at 420, the image evaluation takes place. The image evaluation can be performed with an algorithm that is programmed to detect a waypoint based on the curvature of the roadside (a turning in a road). There are powerful algorithms for edge detection or edge extraction which can also detect the roadside. Another exemplary embodiment consists in detecting the announced waypoint by recognizing spatially fixed traffic signs or other infrastructure objects or infrastructure points, such as traffic lights, railway crossings, zebra crossings, etc. It is furthermore possible to use fixedly installed radio beacons that transmit the exact distance from the waypoint and are designed such that they are easy to recognize by way of image evaluation. The apparatus will then receive the signal of the radio beacon by way of the on-board unit 160 and evaluate it to superpose the corresponding distance mark 24 in the correct location at the level of the radio beacon in the navigation route.

After the waypoint has been detected, the grid 22 is calculated in program operation at 425 for the representation of the navigation path and the location of the distance marks in the grid 22 is calculated. As is illustrated in FIG. 4, this operation decides which grid symbols 23 must be represented in the color blue so as to form a distance mark 24. The grid 22 may be calculated perspectively. In program operation at 430, the AR data are calculated for the grid representation of the navigation path with the nested distance marks 24. They are calculated taking into account the instantaneous speed of the observer transportation vehicle 10. The instantaneous speed of the observer transportation vehicle 10 is captured by an on-board sensor system or likewise adopted in operation at 415 by the navigation system 130.

In operation at 435, the AR data calculated for the AR superposition of the navigation path are transmitted to the HUD 20. A loop in the program is formed by the operations at 420 to 435, which loop is cycled until it is detected in the interrogation 440 that the announced waypoint has already been reached or crossed. If this is the case, the program is terminated in program operation at 445. If the driver intervenes and leaves the comfort function, the program can be terminated at any time.

All the examples mentioned here and also specific formulations should be understood without limitation to refer to such specifically mentioned examples. For example, a person skilled in the art will recognize that the block diagram illustrated here represents a conceptional view of an exemplary circuit arrangement. Similarly, it is clear that an illustrated flowchart, state transition diagram, pseudocode and the like represent various embodiments for representing processes that can be substantially stored in computer-readable media and can thus be performed by a computer or processor. The object mentioned in the patent claims can expressly also be a person.

It is to be understood that the proposed method and the associated apparatuses can be realized in various forms of hardware, software, firmware, special processors, or a combination thereof. Special processors can comprise application-specific integrated circuits (ASICs), reduced instruction set computer (RISC) and/or field programmable gate arrays (FPGAs). The method proposed and the apparatus may be realized as a combination of hardware and software. The software may be installed as an application program on a program memory apparatus. This is typically a machine based on a computer platform having hardware, such as, for example, one or more central processing units (CPUs), a random-access memory (RAM) and one or more input/output (I/O) interfaces. Typically, an operating system is additionally installed on the computer platform. The various processes and functions that were described here can be a part of the application program or be a part that is executed via the operating system.

The disclosure is not limited to the exemplary embodiments described here. There is scope for various adaptations and modifications that a person skilled in the art would consider, owing to their expert knowledge, as also being part of the disclosure.

The disclosed embodiments are explained in more detail using the example of the use in transportation vehicles. The possibility of using it in aircraft and helicopters, for example, during landing maneuvers or search missions, etc., is also indicated here.

However, it is noted that the use is not limited thereto. The disclosed embodiments can be used whenever the field of view of a driver, of an operator or simply just of a person having smartglasses can be enriched with AR superpositions.

AR superpositions can also simplify operation in remote-controlled devices such as robots in which the remote control is effected via a monitor on which a camera image is reproduced. A possible use thus exists here, too.

LIST OF REFERENCE SIGNS

10 Transportation vehicle
20 Head-up display HUD
21 Virtual projection surface
22 Grid
23 Grid symbol
24 Distance mark 25 Turn arrow
26 Distance indication
30 Touch-sensitive display unit
40 Computation unit
50 Input unit
60 Memory unit
70 Data line to the display unit
80 Data line to the memory unit
90 Data line to the input unit
100 Data bus
110 Instrument cluster
120 Telephone
130 Navigation device
140 Radio
150 Camera
160 Communication module
200 Infotainment system
405—Different
445 program operations

The invention claimed is:

1. A method for calculating an augmented reality superposition of additional information for a display on included in a display unit wherein the superposition of additional information assists a driver of an observer transportation vehicle with longitudinal control of the observer transportation vehicle, the method comprising:
    ascertaining by a localization system, a position of the observer transportation vehicle;
    capturing surroundings of the observer transportation vehicle;
    detecting a location of a waypoint along a navigation route by evaluating the captured surroundings;
    reconciling the ascertained position of the observer transportation vehicle with the location of the waypoint; and
    calculating, based on the reconciliation, the augmented reality superposition of a navigation path along the navigation route scaled to real distances between the observer transportation vehicle and the waypoint, wherein the augmented reality superposition comprises distance marks spaced at distances scaled to real distances and positioned in the navigation path based on instantaneous speed of the observer transportation vehicle;
    wherein the distance marks are each composed of a plurality of grid points.

2. The method of claim 1, wherein the distance marks are calculated as a grid comprising a plurality of grid points, wherein the distance marks are represented as colored or shaped highlighting of grid points in the animation graphic.

3. The method of claim 1, wherein the distance marks are positioned in the navigation path based on the driving scenario to which the observer transportation vehicle is driving and/or on the vicinity in which the transportation vehicle is moving.

4. The method of claim 1, wherein the distance marks are composed of three grid points and symbolize an arrow in a driving direction along the navigation path.

5. The method of claim 1, wherein the grid points are represented by unfilled grid symbols that are diamond shaped.

6. An apparatus for calculating an augmented reality superposition of additional information for a display included in a display unit, wherein the superposition of additional information assists a driver of an observer transportation vehicle with longitudinal control of the observer transportation vehicle, the apparatus comprising: the display unit with which virtual additional information is superposed into a field of view of the driver or of the operator of the apparatus; and
    a computation unit configured to calculate a distance of the observer transportation vehicle relative to a waypoint,
    wherein the computation unit calculates the augmented reality superposition of a navigation path along a navigation route at least up to the waypoint as the observer transportation vehicle approaches the waypoint,
    wherein augmented reality superposition of the navigation path comprises distance marks spaced as distances scaled to real distances between the observer transportation vehicle and the waypoint and positioned in the navigation path based on instantaneous speed of the observer transportation vehicle;
    wherein the distance marks are each composed of a plurality of grid points.

7. The apparatus of claim 6, wherein the distance marks are calculated as a grid comprising a plurality of grid points, wherein the distance marks are represented as colored or shaped highlighting of grid points in the animation graphic.

8. The apparatus of claim 6, wherein the display unit is a head-up display (HUD) or smartglasses.

9. A transportation vehicle, wherein the transportation vehicle comprises the apparatus of claim 6.

10. The apparatus of claim 6, wherein the distance marks are positioned in the navigation path based on the driving scenario to which the observer transportation vehicle is driving and/or on the vicinity in which the transportation vehicle is moving.

11. The apparatus of claim 6, wherein the distance marks are composed of three grid points and symbolize an arrow in the driving direction.

12. The apparatus of claim 6, wherein the grid points are represented by unfilled grid symbols that are diamond shaped.

13. A non-transitory computer readable medium containing instructions to perform a method for calculating an augmented reality superposition of additional information for a display on a display unit in response to being executed in a computation unit, wherein the method comprises:
    ascertaining by a localization system, a position of the observer transportation vehicle;
    capturing surroundings of the observer transportation vehicle;
    detecting a location of a waypoint along a navigation route by evaluating the captured surrounding;
    reconciling the ascertained position of the observer transportation vehicle with the location of the waypoint; and
    calculating, based on the reconciliation, the augmented reality superposition of a navigation path along the navigation route to correspond to real distances between the observer transportation vehicle and the waypoint, wherein the augmented reality superposition comprises distance marks spaced as distances scaled to real distances and positioned in the navigation path based on instantaneous speed of the observer transportation vehicle;
    wherein, in the method, the distance marks are each composed of a plurality of grid points.

14. The non-transitory computer readable medium of claim 13, wherein, in the method, the distance marks are positioned in the navigation path based on the driving scenario to which the observer transportation vehicle is driving and/or on the vicinity in which the transportation vehicle is moving.

15. The non-transitory computer readable medium of claim 13, wherein, in the method, the distance marks are composed of three grid points and symbolize an arrow in a driving direction along the navigation path.

16. The non-transitory computer readable medium of claim 13, wherein, in the method, the grid points are represented by unfilled grid symbols that are diamond shaped.

\* \* \* \* \*